United States Patent [19]

Beckmann et al.

[11] Patent Number: 4,833,939
[45] Date of Patent: May 30, 1989

[54] BUILT-UP CONNECTING ROD

[75] Inventors: Hans-Dieter Beckmann, Gifhorn; Hans-Joachim Oberg, Braunschweig, both of Fed. Rep. of Germany

[73] Assignee: Volkswagen AG, Wolfsburg, Fed. Rep. of Germany

[21] Appl. No.: 195,485

[22] Filed: May 17, 1988

Related U.S. Application Data

[63] Continuation of Ser. No. 915,814, Oct. 6, 1986, abandoned.

[30] Foreign Application Priority Data

Oct. 9, 1985 [DE] Fed. Rep. of Germany ....... 3535991
Aug. 16, 1986 [DE] Fed. Rep. of Germany ....... 3627767

[51] Int. Cl.$^4$ .............................................. G05G 1/00
[52] U.S. Cl. .................. 74/579 E; 74/579 R; 123/197 AB; 92/212; 92/248
[58] Field of Search ................. 74/579 E, 579 R; 92/212, 214, 222, 248, 187, 179; 29/156.5 A; 123/197 AB

[56] References Cited

U.S. PATENT DOCUMENTS

| | | | |
|---|---|---|---|
| 2,048,187 | 7/1936 | Hughes | 74/579 E |
| 2,652,728 | 9/1953 | Kiekhaefer | 74/579 E X |
| 2,738,687 | 3/1956 | Meile | 74/579 E |
| 3,173,344 | 3/1965 | Mongitore | 92/187 |
| 3,238,811 | 3/1966 | Longstreth | 74/579 E |
| 3,626,815 | 12/1971 | Fingeroot | 74/579 E X |
| 3,815,431 | 6/1974 | Alvarez | 74/579 E |
| 4,184,384 | 1/1980 | Levine | 74/579 E |
| 4,329,915 | 5/1982 | Schulz | 74/579 E X |
| 4,403,525 | 9/1983 | Bongers | 74/579 E |
| 4,408,380 | 10/1983 | Schaper et al. | 74/579 E X |
| 4,430,928 | 2/1984 | Magnarelli et al. | 74/579 E X |
| 4,544,299 | 10/1985 | Danckert | 74/579 E X |
| 4,546,669 | 10/1985 | Fischer et al. | 74/579 E |
| 4,549,445 | 10/1985 | Kaufman | 74/579 E X |
| 4,555,961 | 12/1985 | Fischer | 74/579 E |
| 4,635,596 | 1/1987 | Nakano et al. | 123/197 AB |

FOREIGN PATENT DOCUMENTS

| | | | |
|---|---|---|---|
| 0068424 | 6/1982 | European Pat. Off. | 74/579 E |
| 897636 | 10/1953 | Fed. Rep. of Germany | 74/579 E |
| 3207573 | 9/1983 | Fed. Rep. of Germany | 74/579 E |
| 3225324 | 11/1983 | Fed. Rep. of Germany | 74/579 E |
| 3225325 | 1/1984 | Fed. Rep. of Germany | 74/579 |
| 3243939 | 5/1984 | Fed. Rep. of Germany | 74/579 E |
| 3329001 | 12/1984 | Fed. Rep. of Germany | 74/579 E |
| 3326467 | 1/1985 | Fed. Rep. of Germany | 74/579 E |
| 3542071 | 6/1986 | Fed. Rep. of Germany | 74/579 E |
| 8604122 | 7/1986 | PCT Int'l Appl. | 74/579 E |
| 361882 | 6/1962 | Switzerland | 92/248 |
| 7980 | 2/1894 | United Kingdom | 74/579 E |
| 446728 | 5/1936 | United Kingdom | 74/579 E |
| 981446 | 1/1965 | United Kingdom | 74/579 E |
| 1364317 | 8/1974 | United Kingdom | 74/579 E |

Primary Examiner—Vinh Luong
Attorney, Agent, or Firm—Brumbaugh, Graves, Donohue & Raymond

[57] ABSTRACT

In order to achieve a positioning close to a combustion chamber of a swivelling axis between a connecting rod and a piston, a curved surface region facing a piston head of a tensioned band which is subjected only to tractive stress and is looped around a connecting rod shank, forms also the pressure transmitting component of a pivot bearing in that it rests directly on a bearing surface on the piston head.

10 Claims, 2 Drawing Sheets

BUILT-UP CONNECTING ROD

This application is a continuation of application Ser. No. 915,814, filed on Oct. 6, 1986 now abandoned.

BACKGROUND OF THE INVENTION

The invention concerns a built-up connecting rod.

From EP patent application No. 0 068,424, F16C 7/00 is known, as a matter of principle, a built-up connecting rod consisting of a connecting rod shank subjected to pressure and an endless metallic looped band enclosing the same together with the crank pin boss and piston pin boss. There, the endless looped band is shrunken the crank pin shank provided with the bosses.

A construction whereby a plurality of looped bands consisting there of a composite fiber material—enclose the connecting rod shank including the piston pin is known from DE-OS No. 33 26 467,F16J 1/16 in such a manner that the piston pin boss provided on the connecting rod shank does not surround the pin completely but provides merely a support for it. Against the support, the piston pin is pulled through the two looped bands, the piston pin, for the purpose of a practically bending moment-free bearing being in contact with the piston head. In the piston head, in the region of contact with the piston pin, are provided cavities for the looped bands. The cavities result in a comparatively "deep", and thus disadvantageous, position of the axis of the piston pin and thereby of the swivelling axis of the connecting rod. In general, it is desirable to situate the axis as high as possible in order to render the transverse forces transmitted during operation from the connecting rod to the piston as small as possible.

SUMMARY OF THE INVENTION

It is an object of the invention to provide an improved built-up connecting rod having the advantages of distribution of the compressive and tractive forces to separate components, i.e., connecting rod shank and looped band, as well as low weight so that in order to reduce the transverse forces acting on the piston, the aforementioned swivelling axis can be moved further "upward", i.e., in an internal combustion engine further in the direction towards the combustion chamber concerned.

Pursuant to this object, and others which will become apparent hereafter, one aspect of the present invention resides in a connecting rod having a shank which extends between a piston pin, which is part of a pivot bearing, and a crank pin boss A looped band winds around the piston pin and the crank pin boss, and has an outer curved metallic surface region which forms the part of the pivot bearing which transmits compressive forces. The piston pin is arranged to transmit only mass forces opposite to the compressive forces.

The invention is contrary to the state of the art according to which in the connecting rod shank is provided an all-around closed crank pin boss surrounded by the looped band, so that the connecting rod in the direction towards the piston has a relatively large thickness of material. Also, contrary to the construction of the aforeindicated Offenlegungsschrift, wherein the thickness of the material of the piston head is increased due to the depth of the grooves provided to accommodate the looped bands, the invention makes use of a surface region of the looped band in order to obtain the pressure-transmitting (upper) component of the defined pivot bearing, so that the piston pin needs to be designed and shaped merely for transmission of the mass forces which are in opposition to the compressive forces exerted by the piston. Accordingly, in cross section, the aforementioned curved surface region of the looped band and the region of the piston pin serving the transmission of the mass forces are placed on an arc of a circle.

Therefore, since grooves, or the like, for compressive force-free accommodation of the looped band in the piston head can be dispensed with and, furthermore, the looped band can be rendered relatively flat, it becomes possible, contrary to the aforecited state of the art, to situate the axis of the pivot bearing relatively high while the piston head can be rendered relatively thin-walled.

In order to avoid the shrinking processes for tensioning of the looped band which are comparatively difficult to effect, further refinements of the invention provide tensioning devices arranged on the side of the connecting rod shank facing away from the crank pin boss relative to the piston pin. By means of a displacement of the center of gravity of the connecting rod shank in this direction, these devices contribute to the reduction of the oscillating mass proportion.

The novel features which are considered as characteristic for the invention are set forth in particular in the appended claims. The invention, itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figures 1, 2:
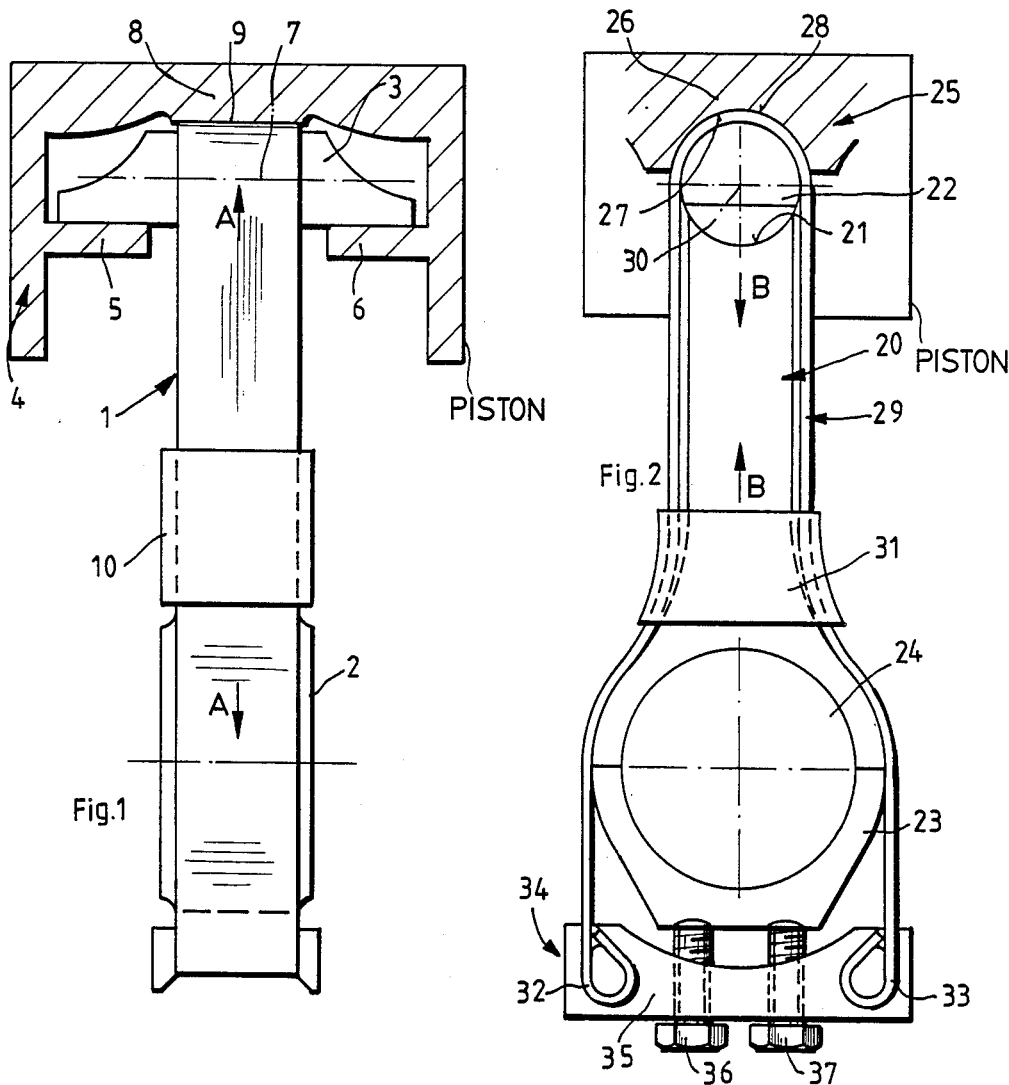
FIG. 1 shows in side view a first embodiment of the invention.
FIG. 2 is a front view of a second embodiment.

Viewing FIG. 1, we find in this side view first of all the looped band 1, which in all embodiments is rendered as a tension-resistant metal band which surrounds the entire connecting rod shank, of which in this figure is visible only the crank pin boss 2, as well as the piston pin 3. The piston is indicated by 4 and it is provided with inwardly-directed bearing extensions 5 and 6 for the lower surface region of the piston pin 3 extending in cross section in an arc of a circle around the swivelling axis 7. The bearing serves to transmit the mass forces of the piston 4 during its downward movements which are triggered by the crankshaft passing through the crank pin boss 2.

The piston pin 3 does not bear directly on the piston head 8 but does so rather via the corresponding surface-machined region 9 of the looped band 1, which region is situated over the same arc of a circle around the pivot bearing axis 7 as the other bearing containing the regions 5 and 6. Thus, the upper region 9 of the looped band 1 transmits to the piston pin not only tractive forces a originating with the crank pin but at the same time transmits to the piston skirt the compressive forces B exerted by the piston during operation so that for the purpose of savings in weight, the piston pin 3 may be rendered in a shape different from a cylinder shape, such as shown, e.g., in the drawing.

It will be explained in detail with reference to FIG. 2 that in order to achieve a slim connecting rod, it may be useful to draw the looped band against the correspondingly designed side cheeks of the connecting rod shank by means of a molded element 10.

Viewing FIG. 2, we find the connecting rod shank 20 which forms a cup-like supporting surface 21 for the piston pin 22 and together with the bearing support 23 has a divided crank pin boss 24 in its lower end. Here again, as in the construction represented in FIG. 1, the piston pin 22 for the purpose of transmission of mass forces bears against the piston 25 at its bottom region, as shown in the figure. Only the piston head 26 is represented in the drawing. Likewise in conformity with the embodiment in FIG. 1, the transmission to the connecting rod of the compressive forces B exerted by the piston 25 is obtained by means of the bearing or running surface 27 provided on the piston head 26 to the connecting rod shank by way of the upper region of the looped band 29. The outer surface 28 of the region, and thus also the contour of the bearing region 27, extends over the arc of a circle around the axis 30 of the piston pin 22 which axis at the same time is also the pivot bearing axis.

In the embodiment in FIG. 2, is shown a molded element 31 which, for attainment of a slim connecting rod, serves to pull the lateral regions of the looped band 29 towards the side cheeks of the connecting rod shank 20 which are convergent relative to the crank pin boss 24. In this embodiment, an "open" looped band 29 has been used whose ends 32 and 33 are fixed in a bridge-type element 35 which forms a component of a tensioning device 34. Setting or tensioning screws 36 and 37 cause the element 35 to bear against the bearing bridge 23 and therefore the connecting rod shank. Accordingly, the screws facilitate the adjustment of a predefined tension of the looped band 29. This construction thus offers the possibility of assembly of the connecting rod with a relaxed looped band, whereafter the desired tension can be set and, if necessary, can be corrected or adjusted during operation. Shrinking-on processes which are complicated and are critical in particular in large-scale production are thus avoided.

Figure 3:
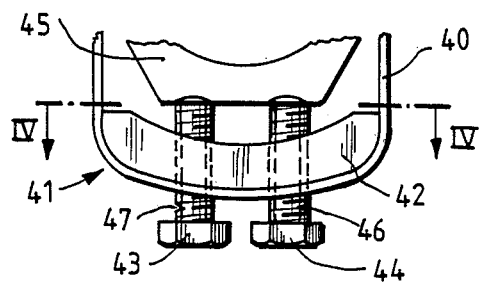
FIG. 3 is a partial side view of a third embodiment.
Figure 4:
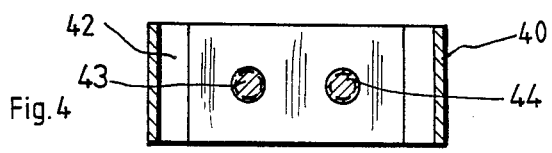
FIG. 4 is a sectional view indicated in FIG. 3.

This advantage is also present in case of the construction described in FIGS. 3 and 4 which has an endless looped band. Here again we find the tensioning device 41 with the bridge-like element 42 which in this example of an embodiment is surrounded on the outside by the looped band 40, the element bearing by way of setting or tensioning screws 43 and 44 on the bearing bridge 45 of the crank pin boss, not shown here.

The tensioning screws 43 and 44 used as pressure screws are provided with desired locations of fracture whereby care is taken that on attainment of the predefined tensioning of the looped band 40, the screw heads are torn off and thus the magnitude of tension is fixed.

Providing tensioning devices of this kind, such as 37 and 41, respectively, offers not only advantages with respect to assembly but also with respect to the operating behavior of the connecting rod since the mass of the tensioning device shifts the mass center of the connecting rod downward, as shown in the drawing, and thus reduces the oscillating share of the mass. This is an advantage which must be added to the fundamental advantage of the construction according to the invention, namely, the possibility of a "high" position of the swivelling axis 7 or 30 in the region of the piston head.

Figure 5:
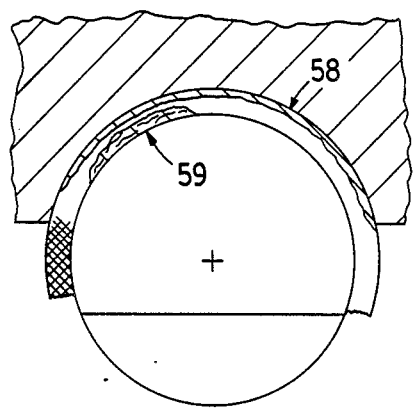
FIG. 5 is an enlarged fragmentary section view of a metallic surface region that forms a component part of the pivot bearing.

In FIG. 5 is shown and enlarged view of the metallic surface region that forms a component part of the pivot bearing. As shown in FIG. 1 and 2, the compressive forces B are exerted by the piston 25 from the bearing or running surface 27, provided on the piston 25 as shown in FIG. 2, to the connecting rod shank, by way of the upper region of the looped band 29. The outer surface 28 of this upper region of the band 29, and thus also the contour of the bearing region 27 of the piston 25, extends over the arc of a circle around the axis 30 of the piston pin 25, as shown in FIG. 2.

Figure 6:
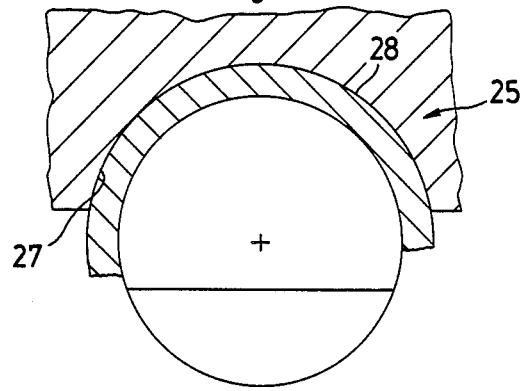
FIG. 6 is an enlarged fragmentary section view of the metallic surface region formed by a metal band.

As shown in FIG. 5, the looped band can be composed of a fiber compound material, which is indicated at the location generally referenced 59, the metallic surface region of the band being metal-armored where it bears on the conforming surface of the piston, as illustrated at the broken away area 58. As shown in section in FIG. 6, the band may be a metal band, in which case the surface thereof in contact with the conforming surface of the piston provides the bearing surface 28. Where it bears on the conforming surface of the piston, the band surface can, in any event, be fine-machined.

While the invention has been illustrated and described as embodied, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

1. An assembly including in combination, a built-up connecting rod and a pivot bearing which has a piston pin as a component part, the connecting rod comprising: a connecting rod shank made of a material resistive to compressive stress, said shank being connected to the piston pin at one end and having a crank pin boss at an opposite end; and a looped band made of a material resistive to tensile stress, said looped band being provided so as to wind around the piston pin and the crank pin boss, and have at least one metallic region provided as an outer curved metallic surface region so as to partly cover the circumference of the piston pin and face away from the crank pin boss, said curved metallic surface region forming a further component part of the pivot bearing, the pivot bearing further including inwardly directed bearing extensions of a piston engaging lower surface regions of the piston pin, and a bearing surface provided so as to engage said outer curved metallic surface region of said looped band.

2. A connecting rod as defined in claim 1, wherein said cured metallic surface region is fine-machined.

3. A connecting rod as defined in claim 1, wherein said looped band is a metal band.

4. A connecting rod as defined in claim 1, wherein said looped band is composed of a fiber compound material, said metallic surface region being metal-armored.

5. A connecting rod as defined in claim 4, wherein said tensioning means includes a bearing member provided so as to be in positive connection with the looped band and bear by way of setting screws on the connecting rod.

6. A connecting rod as defined in claim 5, wherein said looped band is an endless looped band provided so as to unilaterally enclose the bearing member.

7. A connecting rod as defined in claim 5, wherein said looped band has ends which are fixed on the bearing member.

8. A connecting rod as defined in claim 5, wherein said setting screws have screw heads and are provided with desired locations of fracture so that on attainment of a predefined tension value in said looped band, the screw heads tear off.

9. A connecting rod as defined in claim 1; and further comprising means for tensioning said looped band, said tensioning means being provided on a side of the crank pin boss facing away from the piston pin.

10. An assembly including a piston, a piston pin, and a built-up connecting rod, the built-up connecting rod comprising: a connecting rod shank connected to the piston pin at one end, and a looped band entrained over the piston pin and along sides of the shank said looped band being metallic at least in an outer curved surface region forming a pivot bearing in contact with the piston, and the piston pin being in tensile force transmitting relation between the piston and the shank.

* * * * *

UNITED STATES PATENT AND TRADEMARK OFFICE
CERTIFICATE OF CORRECTION

PATENT NO. : 4,833,939

DATED : May 30, 1989

INVENTOR(S) : Beckmann et al.

It is certified that error appears in the above-identified patent and that said Letters Patent is hereby corrected as shown below:

Column 1, line 15, "shrunken" should read --shrunk on--;

Column 2, line 68, "forces a" should read --forces A--;

Column 4, line 5, "and" should read --an--;

Column 4, line 57, "engaging" should read --provided so as to engage--;

Column 4, line 59, "provided so as to engage" should read --engaging--;

Column 4, line 62, "cured" should read ---curved--.

Signed and Sealed this

Fourth Day of September, 1990

Attest:

HARRY F. MANBECK, JR.

*Attesting Officer*      *Commissioner of Patents and Trademarks*